(12) United States Patent
Hanson et al.

(10) Patent No.: US 9,952,397 B2
(45) Date of Patent: Apr. 24, 2018

(54) UNIVERSAL MULTI-PURPOSE COMPARTMENTALIZED TELECOMMUNICATIONS BOX

(71) Applicant: PPC Broadband, Inc., East Syracuse, NY (US)

(72) Inventors: Brian K. Hanson, Cicero, NY (US); Peter A. Carapella, Fayetteville, NY (US)

(73) Assignee: PPC BROADBAND INC., East Syracuse, NY (US)

( * ) Notice: Subject to any disclaimer, the term of this patent is extended or adjusted under 35 U.S.C. 154(b) by 0 days.

(21) Appl. No.: 14/863,427

(22) Filed: Sep. 23, 2015

(65) Prior Publication Data

US 2016/0091681 A1    Mar. 31, 2016

Related U.S. Application Data

(60) Provisional application No. 62/053,850, filed on Sep. 23, 2014.

(51) Int. Cl.
*G02B 6/44* (2006.01)
*H02G 3/08* (2006.01)

(52) U.S. Cl.
CPC .......... *G02B 6/445* (2013.01); *G02B 6/4448* (2013.01); *H02G 3/081* (2013.01); *H02G 3/083* (2013.01); *H02G 3/086* (2013.01); *H02G 3/088* (2013.01)

(58) Field of Classification Search
CPC ...... G02B 6/445; G02B 6/4448; H02G 3/081; H02G 3/086; H02G 3/088; H02G 3/083
See application file for complete search history.

(56) References Cited

U.S. PATENT DOCUMENTS 4,850,014 A * 7/1989 Gillis ............... H04Q 1/028
361/657
4,998,894 A   3/1991 Gronvall
(Continued)

FOREIGN PATENT DOCUMENTS

DE    19740246 C1    2/1999
SE    WO 0165295 A1 * 9/2001    ........... G02B 6/4448
(Continued)

OTHER PUBLICATIONS

Dec. 11, 2015 International Search Report issued in International Application No. PCT/US2015/051802.
(Continued)

*Primary Examiner* — Peter Radkowski
(74) *Attorney, Agent, or Firm* — Oliff PLC

(57) ABSTRACT

An enclosable box for housing components from more than one telecommunication systems including a first housing portion, a second housing portion, a box mounting hinge that connects the first housing portion and the second housing portion, an internal telecommunication component compartment panel, a compartment panel mounting hinge that connects the internal telecommunication component compartment with one of the first and second housing portions. The box mounting hinge may be configured to allow the first housing portion and second housing portion to open and close in a clam like manner. The compartment panel mounting hinge may be configured to allow the compartment panel to open and close an internal compartment or cavity that is large enough to enclose at least a first telecommunications systems component.

24 Claims, 12 Drawing Sheets

(56) References Cited

U.S. PATENT DOCUMENTS

| | | | |
|---|---|---|---|
| 5,029,958 A | | 7/1991 | Hodge et al. |
| 5,274,731 A | * | 12/1993 | White .................. G02B 6/4455 385/134 |
| 5,420,958 A | * | 5/1995 | Henson ................ G02B 6/3806 385/135 |
| 5,668,911 A | * | 9/1997 | Debortoli ............. G02B 6/4446 385/135 |
| 5,721,396 A | * | 2/1998 | Daoud ................... H01R 13/46 174/59 |
| 5,892,872 A | | 4/1999 | Glover |
| 6,242,697 B1 | * | 6/2001 | Gerken ................. H02G 3/085 16/2.1 |
| 6,264,056 B1 | * | 7/2001 | King ........................ E03C 1/20 206/518 |
| 6,265,670 B1 | * | 7/2001 | Duesterhoeft ......... H02G 3/083 174/152 G |
| 6,282,285 B1 | | 8/2001 | Daoud |
| 6,427,045 B1 | | 7/2002 | Matthes et al. |
| 6,661,961 B1 | | 12/2003 | Allen et al. |
| 7,198,409 B2 | | 4/2007 | Smith et al. |
| 7,233,731 B2 | | 6/2007 | Solheid et al. |
| 7,349,616 B1 | | 3/2008 | Castonguay et al. |
| 7,397,997 B2 | | 7/2008 | Ferris et al. |
| 7,660,409 B1 | * | 2/2010 | Czerwiec ............. H04M 1/003 379/325 |
| 7,672,450 B2 | | 3/2010 | Paulsen |
| 7,737,360 B2 | * | 6/2010 | Wiemeyer ............... H04Q 1/13 174/481 |
| 7,751,675 B2 | * | 7/2010 | Holmberg ............ G02B 6/4446 385/134 |
| 7,809,233 B2 | | 10/2010 | Smith et al. |
| 7,809,234 B2 | | 10/2010 | Smith et al. |
| 7,816,602 B2 | | 10/2010 | Landry et al. |
| RE42,258 E | | 3/2011 | Thompson et al. |
| 8,020,813 B1 | * | 9/2011 | Clark ....................... G02B 6/445 248/74.2 |
| 8,244,090 B2 | | 8/2012 | Kutsuzawa |
| 8,254,741 B2 | | 8/2012 | Imaizumi et al. |
| 8,263,861 B2 | * | 9/2012 | Landry ................. G02B 6/4452 174/17 R |
| 8,705,929 B2 | | 4/2014 | Kowalczyk et al. |
| 8,811,791 B2 | | 8/2014 | Solheid et al. |
| 8,938,147 B2 | | 1/2015 | Krampotich et al. |
| 9,008,483 B2 | * | 4/2015 | Larsson ................. G02B 6/445 385/135 |
| 9,122,021 B2 | | 9/2015 | Elenbaas et al. |
| 9,151,922 B2 | | 10/2015 | Claessens et al. |
| 9,201,206 B2 | | 12/2015 | Smith et al. |
| 2005/0276562 A1 | | 12/2005 | Battey et al. |
| 2006/0067522 A1 | | 3/2006 | Paulsen |
| 2006/0153516 A1 | | 7/2006 | Napiorkowski et al. |
| 2006/0269216 A1 | * | 11/2006 | Wiemeyer ................ H04Q 1/13 385/147 |
| 2007/0272440 A1 | | 11/2007 | Grunwald et al. |
| 2009/0202214 A1 | * | 8/2009 | Holmberg ............ G02B 6/4446 385/135 |
| 2009/0310927 A1 | * | 12/2009 | Riggsby ............... G02B 6/4471 385/135 |
| 2009/0314907 A1 | * | 12/2009 | Romerein ........... H04M 1/0293 248/205.1 |
| 2010/0074578 A1 | | 3/2010 | Imaizumi et al. |
| 2010/0329622 A1 | | 12/2010 | Kutsuzawa |
| 2011/0013875 A1 | * | 1/2011 | Bran de Leon ........ G02B 6/445 385/135 |
| 2011/0242735 A1 | * | 10/2011 | Landry ................ G02B 6/4452 361/622 |
| 2011/0305422 A1 | | 12/2011 | Thompson et al. |
| 2012/0248112 A1 | * | 10/2012 | Amidon ................... H02G 3/14 220/241 |
| 2012/0321268 A1 | | 12/2012 | Claessens et al. |
| 2014/0023334 A1 | * | 1/2014 | Larsson ................. G02B 6/445 385/135 |

FOREIGN PATENT DOCUMENTS

| | | |
|---|---|---|
| WO | 02071123 A1 | 9/2002 |
| WO | 2005045487 A2 | 5/2005 |
| WO | 2005045487 A3 | 8/2005 |
| WO | 2012138856 A1 | 10/2012 |

OTHER PUBLICATIONS

Feb. 5, 2016 Search Report issued in International Application No. PCT/US2015/064851.
Feb. 18, 2016 Office Action Issued in U.S. Appl. No. 14/964,568.
Oct. 21, 2016 Office Action Issued in U.S. Appl. No. 14/964,568.
FieldSmart Fiber Scalability Center (FSC) Installation Manual, http://www.clearfieldconnection.com/products/cabinets/pon-cabinets.html, pp. 1-60, 2014.
FieldSmart Fiber Scalability Center (FSC) PON Cabinets Data Sheet, http://www.clearfieldconnection.com/products/cabinets/pon-cabinets.html, pp. 1-6.
Clearfield Clearview Blue Cassette Data Sheets, http://www.clearfieldconnection.com/products/cassettes.html, pp. 1-4.
Clearview Classic Cassette Data Sheets, http://www.clearfieldconnection.com/products/cassettes.html, pp. 1-4.
Mar. 28, 2017 Search Report issued in International Application No. PCT/US2015/051802.

* cited by examiner

UNIVERSAL MULTI-PURPOSE COMPARTMENTALIZED TELECOMMUNICATIONS BOX

PRIORITY TO PROVISIONAL APPLICATION

This application claims the benefit of priority of U.S. Provisional Patent Application No. 62/053,850, filed Sep. 23, 2014.

BACKGROUND

Technical Field

Cable and/or Internet service providers may offer a variety of transmission technologies (e.g., radio, telephone, coaxial cable, twisted pair, fiber optic, broadband, wireless broadband, and satellite communications). Generally speaking, these telecommunication system services are routed via a signal-carrying cable (e.g., coaxial) to a subscriber's residence or office. Before entering a subscriber's residence/office, such cables generally pass through a secure enclosure (i.e., "house box," or "entry box"). During, for example, residential installation of cable service, the house box provides access to certain components necessary for installation of the cable service (e.g., coaxial male and female connectors that must be connected, installing a splitter (providing service connection endpoints at multiple locations within the residence/office), and/or an amplifier (boosting a signal being conveyed to a distal location within the residence/office).

The present disclosure relates to the above-mentioned telecommunication technologies, especially, enclosable house boxes and methods for installing telecommunication components. (Installing telecommunication components comprising: installation, removal, and modification). In particular, the disclosure provides a universal multi-purpose enclosure or enclosable house box for one or more types of telecommunication system components (e.g., a multi-purpose box that provides both RF network (coaxial cables) and fiber optic transmission technology). The multi-purpose house box may be configured to have an internal cavity that is large enough to allow the service provider (universal) flexibility in choosing and exchanging various components of various telecommunication systems of a variety of sizes (e.g., different telecommunication systems types, styles and manufacturers). The present disclosure shows an embodiment including a (first) fiber telecommunication system component(s) with an easily accessible (second) RF equipment (coaxial cable) system, but it should be appreciated that it may be desired to configure the box to house different types/sizes of telecommunication equipment.

In this embodiment, the universal house box may be configured to ensure safe and effective fiber handling (first telecommunication system) while allowing easy access for RF network changes and modifications (second telecommunication system). To do such, the enclosable box may provide an internal compartment panel that may both enclose (read: protect, prevent access to) a first type of telecommunication system, such as, fiber components (thereby minimizing inadvertent human error directed at/received by the second type of telecommunications system). In addition, the compartment panel and universal house box may be configured such that a second type of telecommunication system (e.g., non-fiber components, RF components) may be provided in (read: fit within) the space remaining (within the box) outside of the compartment created by/underneath the panel. Further, an upper surface of the panel may be configured to be mountable/attachable with a second communication system type component (e.g., a splitter). With the universal, multi-purpose house box, a telecommunications service provider may use only one box (instead of two) to provide both a first type of telecommunications service (e.g., a subscription cable television package (via RF equipment)), and a second type of telecommunications service (e.g., broadband (fiber optic-level) internet).

Not only does this embodiment remove the need for an unnecessary extra box (for dual-communication system type subscribers), but the panel, as an example, allows the service provider to be more efficient with human resources (by protecting (via access prevention) the first (fiber) communication system from untrained/under-trained installation technicians whose job function/task may be related to the second communication system only).

Thus, the service provider may have greater labor efficiency (by allowing untrained technicians to work on segregated fiber boxes). In a conventional telecommunication service installation in a conventional box, the technician must possess requisite knowledge of multiple systems each requiring a different skill or proficiency level. For example, an installation procedure may require the combined proficiency in each of fiber optic, coaxial and data communications systems. To address these requirements, a service provider may try training all technicians to the highest possible skill level (ensuring each technician an installation can be performed by a single technician). Alternatively, the service provider may try and manage technicians such that the "right" technician for the task at hand is delegated for the task. While this practice may result in greater efficiency, it may also adversely impact performance (e.g., if the installation is performed incorrectly). With respect to the latter, a technician installing coaxial cable may be unfamiliar with the intricacies of fiber optic cable (e.g., such as a need to maintain a minimum permissible bend radius to maintain signal integrity). In fiber-optic cables, the minimum permissible bend radius is very important. That is, inadvertently bending a fiber-optic cable beyond its permissible bend radius can result in a loss of signal performance.

Therefore, there is a need to overcome, or otherwise lessen the effects of, the disadvantages and shortcomings described above. For example, utilizing the disclosed box has, as an example, the advantage of allowing for error free installation of components related to a second telecommunication system (e.g., RF equipment, coaxial splitters) in an enclosable box that provides a hidden, nested compartment for equipment related to a first telecommunication system (e.g., fiber components). Thus, protecting the first telecommunication from harm, even if inadvertent (e.g., by an individual (service provider technician) who does not possess fiber optics handling training).

Related Art

House boxes (configured for telecommunication system components) are generally known. However, the majority of conventional house boxes are configured to house only one type of telecommunication system component (e.g., a fiber-only house box made by and for a specific manufacturer). Thus, with a conventional fiber house box, service providers must place at least two separate boxes on, for example, a homeowner's (residential) property with broadband subscriptions (The use of multiple component installation (house) boxes on a subscriber's residential property is undesirable both technically and esthetically).

Recently, some manufacturers have provided a large-size custom-built box on demand, but, as discussed above, conventional boxes are completely silent regarding providing access to certain components (e.g., RF equipment) while preventing access to (or hiding) other components (e.g., fiber optics components). For example, a service provider may desire to prevent access to components (e.g., fiber components) by individuals who do not have the requisite training to access those components (e.g., an untrained installation technician, residents who are attempting to install cable service on their own).

In other words, conventional boxes do not adequately allow for, inter alia, segregation of fiber components, proper fiber management and laser safety.

SUMMARY

One or more aspects of the present disclosure provide a compartmentalized box for housing components for telecommunications systems, comprising: a first housing portion; a second housing portion pivotally coupled to the first housing portion, the first housing portion and the second housing portion cooperating to define an enclosure having a cavity, the second housing portion being pivotally movable relative to the first housing portion between an open configuration providing access to the cavity and a closed configuration; and a compartment panel disposed in the cavity and being pivotally coupled to the first housing portion, the compartment panel being pivotally movable relative to the first housing portion between a closed position and an open position, wherein when the first housing portion and the second housing portion are in the open configuration and the component panel is in the closed position, the component panel divides the cavity into a first compartment configured to house a first telecommunications system component therein and a second compartment configured to house a second telecommunications system component therein, the first compartment being open such that the first telecommunications system component is accessible to the user, and the second compartment being closed to block access to a second telecommunications system component, and when the first housing portion and the second housing portion are in the open configuration and the component panel is in the open position, the second compartment and the second telecommunications system component are accessible to the user.

The second telecommunication system component may be different than the first telecommunication system component. The second telecommunication system component may be a fiber optic system component. The first telecommunication system component may be an RF system component. The first housing portion and the second housing portion may both be constructed of weatherproof, durable material, the material being one of plastic and metal. The first housing portion or the second housing portion is configured to be attached or mounted to a utility pole and/or a residential or commercial building.

The disclosure also shows a compartmentalized box for housing components for telecommunications systems, comprising: a first housing portion; a second housing portion pivotally coupled to the first housing portion, the first housing portion and the second housing portion cooperating to define an enclosure having a cavity, the second housing portion being pivotally movable relative to the first housing portion between an open configuration providing access to the cavity and a closed configuration; a first telecommunications system component mounted to the first housing portion; a compartment panel disposed in the cavity and being pivotally coupled to the first housing portion, the compartment panel being pivotally movable relative to the first housing portion between a closed position and an open position; and a second telecommunications system component mounted to the compartment panel, the second telecommunications system component being accessible to a user when the first housing portion and the second housing portion are in the open configuration and the compartment panel is in the closed position, wherein when the first housing portion and the second housing portion are in the open configuration and the component panel is in the closed position, the component panel divides the cavity into a first compartment and a second compartment, the first compartment and the second telecommunications system component being accessible to the user and the second compartment being closed to block access to the first telecommunications system component, and when the first housing portion and the second housing portion are in the open configuration and the component panel is in the open position, the second compartment and the first telecommunications system component are accessible to the user.

The disclosure also provides an enclosable box for housing components from more than one telecommunication systems, comprising: a first housing portion, a second housing portion, a box mounting hinge that connects the first housing portion and the second housing portion, an internal telecommunication component compartment panel, a compartment panel mounting hinge that connects the internal telecommunication component compartment with one of the first and second housing portions, wherein the box mounting hinge is configured to allow the first housing portion and second housing portion to open and close in a clam like manner, the compartment panel mounting hinge is configured to allow the compartment panel to open and close an internal compartment or cavity that is large enough to enclose at least a first telecommunications systems component.

The upper surface of the compartment panel may be configured to be mounted by a second telecommunication component within the housing. The second telecommunication system may be different than the first telecommunication system. The first telecommunication system component may be a fiber optics telecommunication system component. The second telecommunication system component may be an RF component or coaxial cable component. The outer portion of either the first or second housing portions may be configured to be attached or mounted to a utility pole and/or a residential or commercial building. The enclosable box may further include a second box mounting hinge, and an entry hole is formed in the box between the box mounting hinges that provides enough clearance for cables/cords to be provided to the internal compartment of the box and/or the remaining cavity outside of the internal compartment within the box. The internal compartment panel, when closed, may be configured to provide a secure enclosure to one or more first telecommunication system components within a cavity enclosed by the internal compartment panel, the enclosable box is configured to, when the box and panel are both closed, provide a secure enclosure for housing one or more second telecommunication system components in the remaining cavity space of the box outside of the internal compartment cavity.

BRIEF DESCRIPTION OF THE DRAWINGS

Exemplary embodiments will be described with reference to the following drawings.

DETAILED DESCRIPTION OF EXEMPLARY EMBODIMENTS

Figure 1:
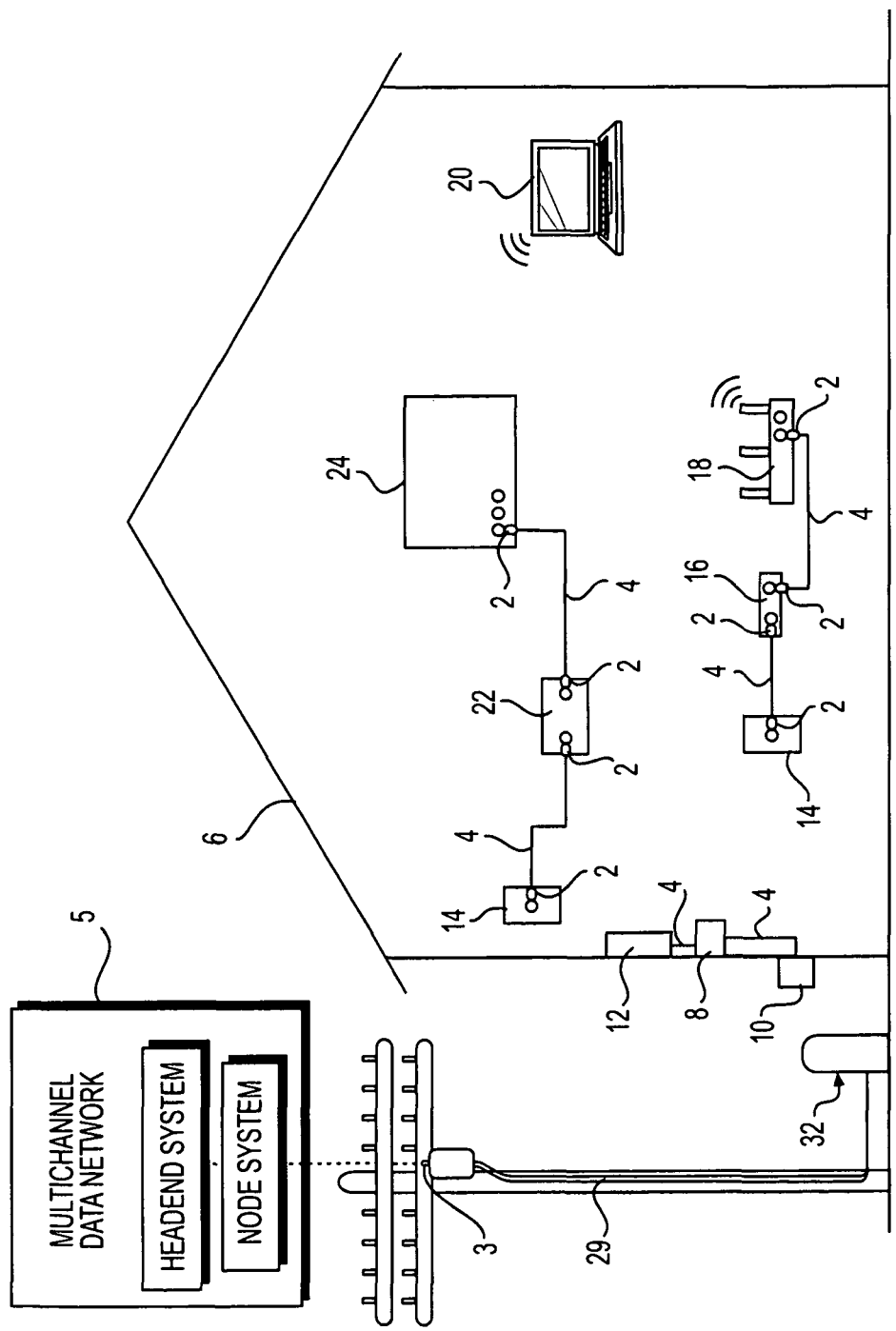
FIG. 1 shows a schematic view of an exemplary network environment in accordance with various aspects of the disclosure.

FIG. 1 shows a schematic view of an exemplary network environment 6 in accordance with various aspects of the disclosure. In particular, cable connectors 2 and 3 may enable the exchange of data signals between a broadband network or multichannel data network 5, and various devices within a home, building, venue or other environment 6. For example, the environment 6 may include the following devices: (a) a point of entry ("PoE") filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency ("RF") signals to generate digital signals to operate a wireless router 18; (d) an Internet accessible device, such as a mobile phone or computer 20, wirelessly coupled to the wireless router 18; and (e) a set-top unit 22 coupled to a television ("TV") 24. In one embodiment, the set-top unit 22, typically supplied by the data provider (e.g., the cable TV company), may include a TV tuner and a digital adapter for High Definition TV.

In some embodiments, the multichannel data network 5 may include a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol ("VoIP") phone service, Internet Protocol TV ("IPTV") data streams, multimedia content, audio data, music, radio and other types of data/data services.

In some embodiments, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range of 1125 MHz to 1675 MHz. MoCA compatible devices can form a private network inside the environment 6.

As shown in FIG. 1, coaxial cables 4, 29 may be provided at different locations and may be configured to distribute the data to the environment 6 via connectors 2 attached to the coaxial cables 4. The cables 4, through use of the connectors 2, are connectable to various communication interfaces within the environment 6, such as the female interface port 14 illustrated in FIG. 2. In the examples shown, female interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
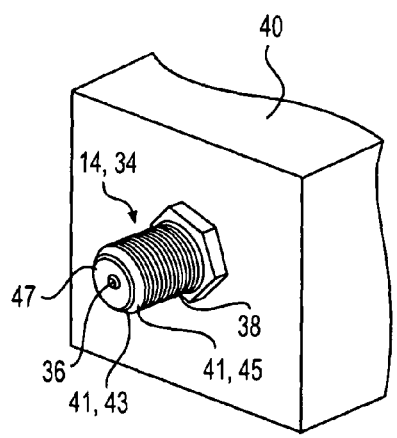
FIG. 2 shows a perspective view of an exemplary interface port in accordance with various aspects of the disclosure.

In one embodiment, each of the female interface ports 14 includes a stud or jack, such as the cylindrical stud 34 illustrated in FIG. 2. The stud 34 may have: (a) an inner, cylindrical wall 36 defining a central hole configured to receive an electrical contact, wire, pin, conductor (not shown) positioned within the central hole; (b) a conductive, threaded outer surface 38; (c) a conical conductive region 41 having conductive contact sections 43 and 45; and (d) a dielectric or insulation material 47.

In some embodiments, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer (installing technician) may couple a cable 4 to an interface port 14 by screwing or pushing the connector 2 onto the female interface port 34. Once installed, the connector 2 receives the female interface port 34. The connector 2 establishes an electrical connection between the cable 4 and the electrical contact of the female interface port 34.

The coaxial cable 4 may extend along a cable axis or a longitudinal axis. In one embodiment, the cable 4 includes: (a) an elongated center conductor or inner conductor 44; (b)

an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in some embodiments, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 3:
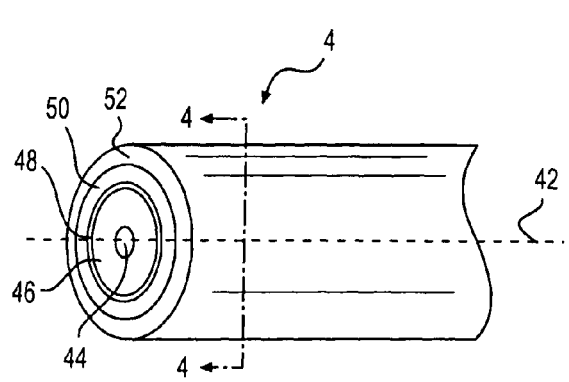
FIG. 3 shows a perspective view of an exemplary coaxial cable in accordance with various aspects of the disclosure.
Figure 4:
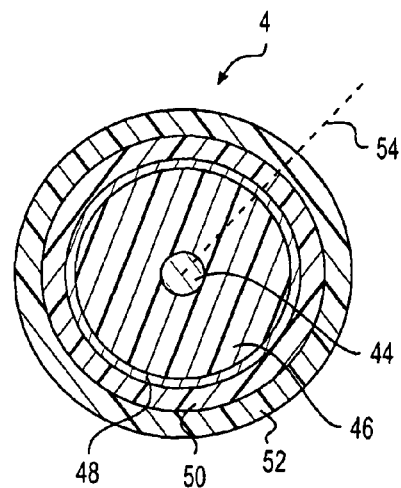
FIG. 4 shows a cross-sectional view of the exemplary coaxial cable of FIG. 3.

In the embodiment illustrated in FIGS. 3 and 4 (cross-sectional view), the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, the connector 2 electrically grounds the outer conductor 50 of the coaxial cable 4. The conductive foil layer 48, in one embodiment, is an additional, tubular conductor which provides additional shielding of the magnetic fields. In one embodiment, the jacket 52 has a protective characteristic, guarding the cable's internal components from damage. The jacket 52 also has an electrical insulation characteristic.

Figure 5:
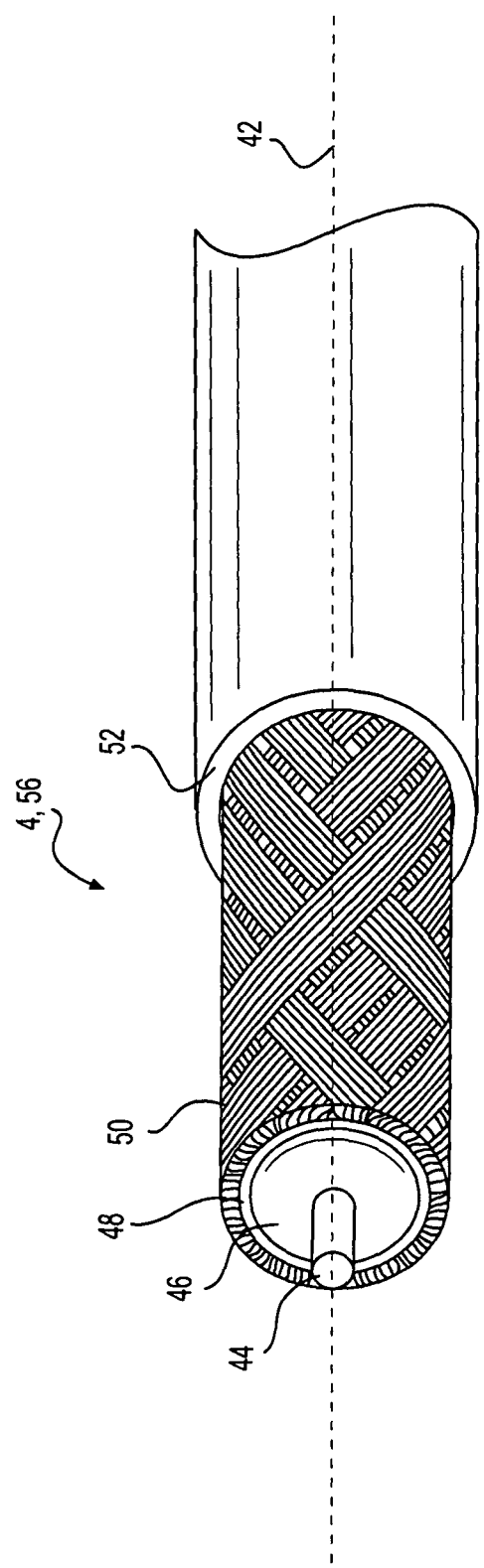
FIG. 5 shows a perspective view of an exemplary prepared end of the exemplary coaxial cable of FIG. 3.

As shown in FIG. 5, during installation, an installer or preparer may prepare a terminal end 56 of the cable 4 so that it can be mechanically connected to the connector 2. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 5, the prepared end 56 has a two step-shaped configuration. In some embodiments, the prepared end has a three step-shaped configuration (not shown), where the insulator 46 extends beyond an end of the foil 48 and outer conductor 50. At this point, the cable 4 is ready to be connected to the connector 2.

Depending upon the embodiment, the components of the cable 4 can be constructed of various materials which have some degree of elasticity or flexibility. The elasticity enables the cable 4 to flex or bend in accordance with broadband communications standards, installation methods or installation equipment. Also, the radial thicknesses of the cable 4, the inner conductor 44, the insulator 46, the conductive foil layer 48, the outer conductor 50 and the jacket 52 can vary based upon parameters corresponding to broadband communication standards or installation equipment.

Figure 6:
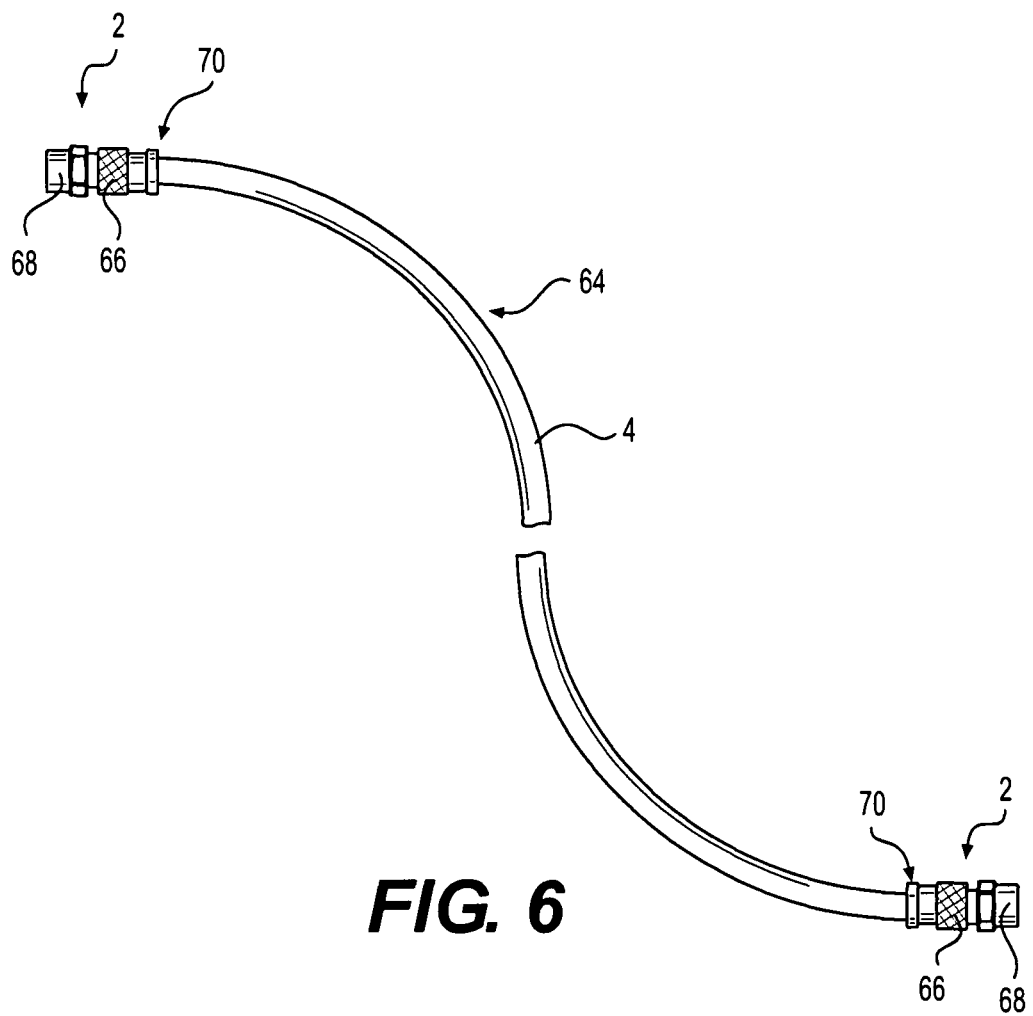
FIG. 6 shows a top view of one embodiment of a coaxial cable jumper or cable assembly which is configured to be operatively coupled to a multichannel data network.

In one embodiment illustrated in FIG. 6, a cable jumper or cable assembly 64 includes a combination of the connector 2 and the cable 4 attached to the connector 2. In this embodiment, the connector 2 includes a connector body or connector housing 66 and a fastener or coupler 68, such as a threaded nut, which is rotatably coupled to the connector housing 66. The cable assembly 64 has, in one embodiment, connectors 2 on both of its ends 70. In some embodiments, the cable assembly 64 may have a connector 2 on one end and either no connector or a different connector at the other end. Preassembled cable jumpers or cable assemblies 64 can facilitate the installation of cables 4 for various purposes.

The cable 4 may be a weatherized coaxial cable 29 that has the same structure, configuration and components as coaxial cable 4 except that the weatherized coaxial cable includes additional weather protective and durability enhancement characteristics. These characteristics enable the weatherized coaxial cable to withstand greater forces and degradation factors caused by outdoor exposure to weather.

During installation the installation technician may perform a folding process to prepare the cable 4 for connection to connector 2. The preparer may fold the braided outer conductor 50 folded backward onto the jacket 52. As a result, the folded section 60 may be oriented inside out. The bend or fold 62 may be adjacent to the foil layer 48 as shown. Certain embodiments of the connector 2 include a tubular post. In such embodiments, this folding process can facilitate the insertion of such post in between the braided outer conductor 50 and the foil layer 4

Depending upon the embodiment, the components of the cable 4 can be constructed of various materials which have some degree of elasticity or flexibility, which enables the cable 4 to flex or bend in accordance with broadband communications standards, installation methods or installation equipment. Further, the radial thicknesses of the cable 4, the inner conductor 44, the insulator 46, the conductive foil layer 48, the outer conductor 50 and the jacket 52 can vary based upon parameters corresponding to broadband communication standards or installation equipment.

Figure 7:
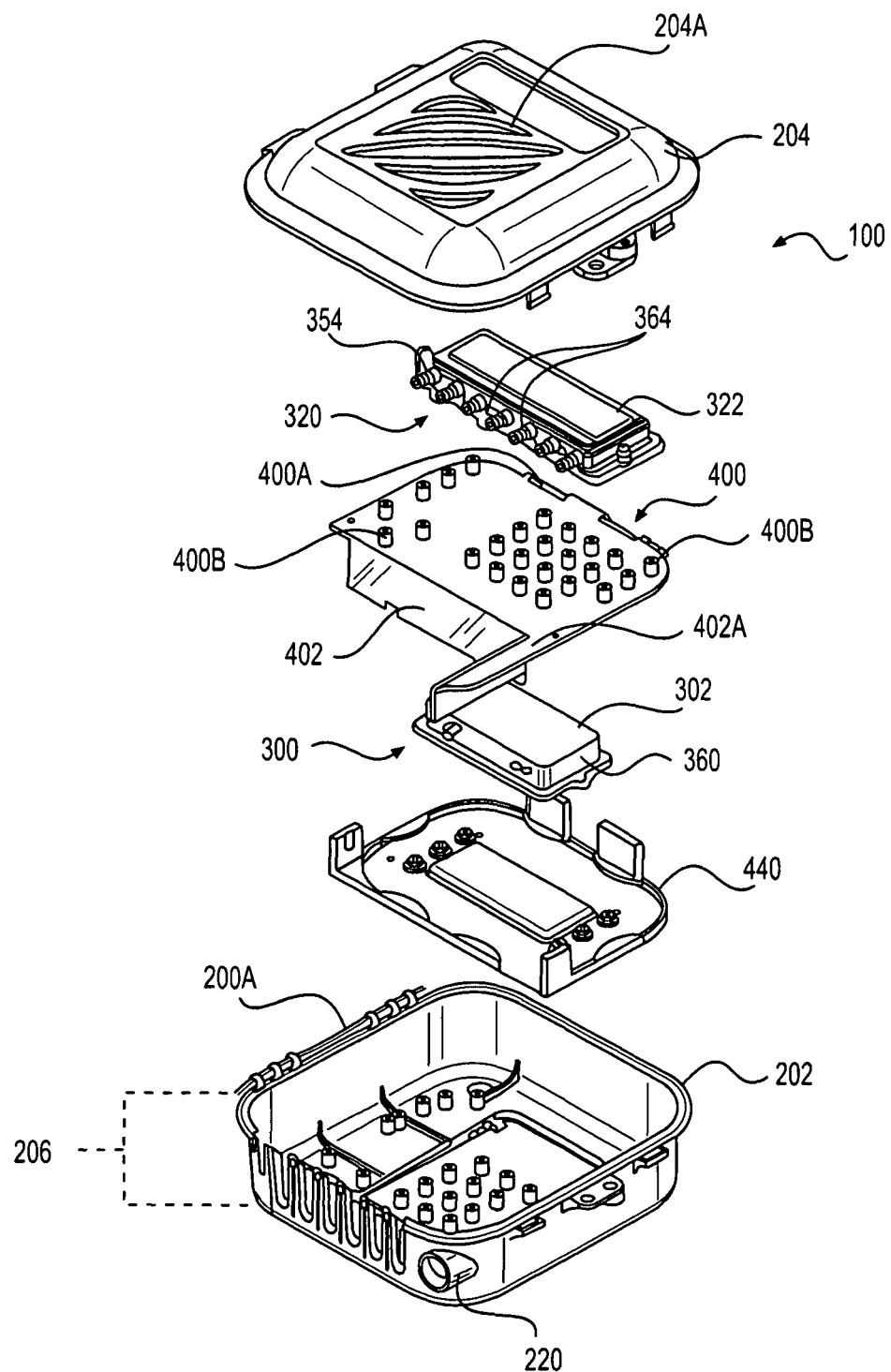
FIG. 7 shows an exploded view of a first embodiment of the secure enclosure or enclosable box.

FIG. 7 shows an exploded view of a first embodiment of the secure enclosure or enclosable box 100 (or "entry box," "house box," or "fiber box"). In particular, FIG. 7 shows the parts of an embodiment of a secure enclosable box 100 that may be configured to provide housing for multiple types of telecommunication system components (i.e., a universal, multi-purpose housing). The enclosable box 100 may comprise a housing including a lower (first) housing portion 202 and an upper (second) housing 204, which each may be configured to be permanently (or semi-permanently) pivotally joined together at corresponding first edges (FIG. 9: 208A) by a mechanism 200A allowing the box to pivotally open and close. For example, the first and second housing portions may be configured to be joined together by a box mounting hinge 200A that is configured to allow the first and second housing portions to pivotally open, such as, by a force that causes the opposite (second) corresponding edges (FIG. 9: 208B) of the first and second housing portions 202, 204 to move in opposite directions. The first and/or second housing portions 202, 204 may form an internal box cavity 206 (shown in primarily located in first housing portion 202, but the cavity may be split between the housing portions and/or modified as desired). When the box is closed, the box may provide a secure enclosure providing protection from weather, fire and/or theft of two or more telecommunication installation systems (and their respective installation components).

As shown in FIG. 7, the housing portions 202, 204 may be configured to provide a cavity 206 that is configured to house/enclose components (fiber optic converter 302 and a cable splitter 322) of two different types of telecommunication service 300, 320. The fiber optic converter 302 and cable splitter 322 may be separated by panel 400. Accordingly, the secure enclosure or box 100 may provide both fiber optic and coaxial cable systems 300, 320 each having at least one different type of telecommunication system component 302, 322.

Figure 8:
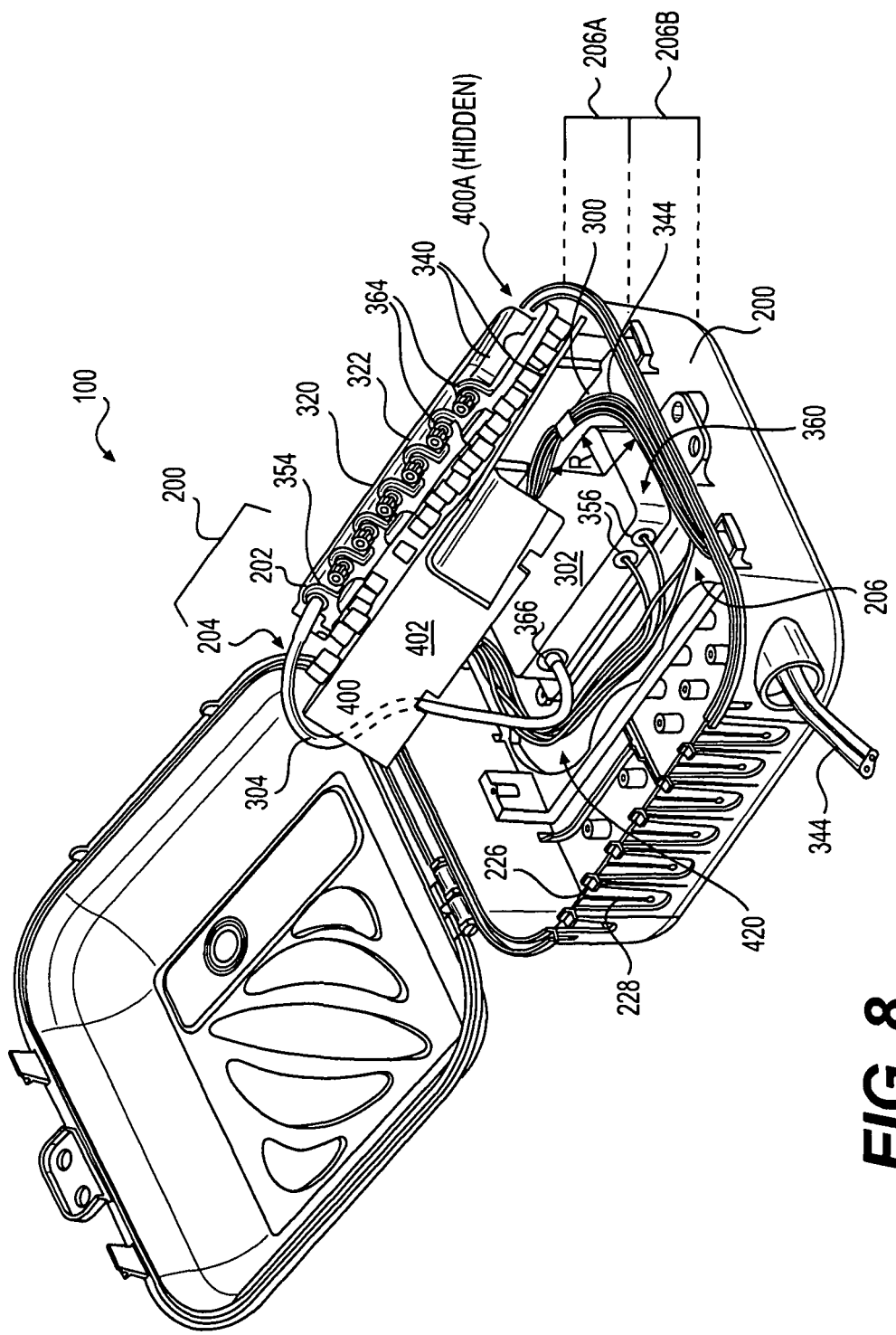
FIG. 8 shows a perspective view of the first embodiment of the secure enclosure or enclosable box with a segregating or hidden compartment panel in an open state.
Figure 9:
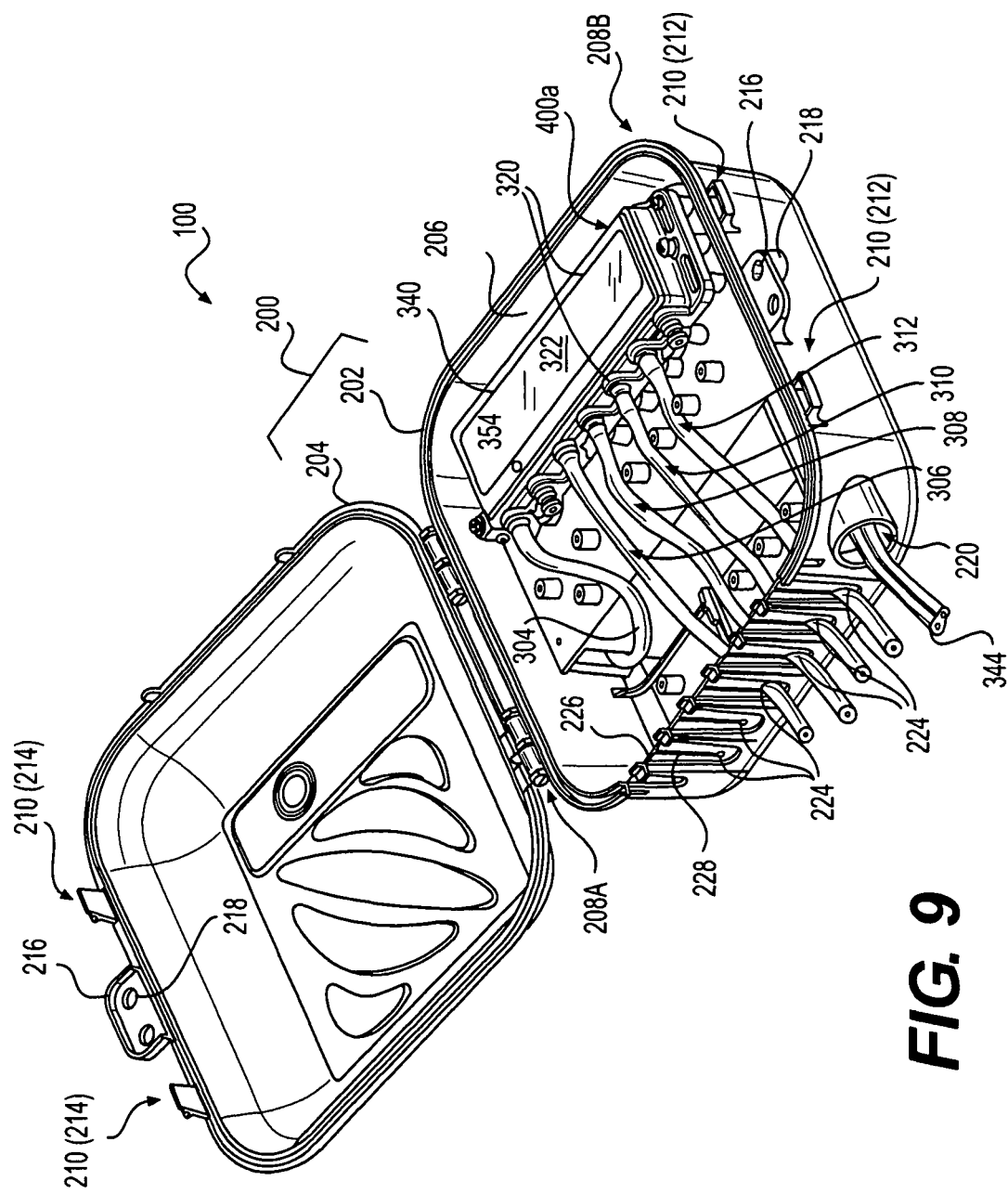
FIG. 9 shows a perspective view of the first embodiment of the secure enclosure or enclosable box with the segregating or hidden compartment panel in a closed state.

The lower housing portion 202 (or upper housing portion 204) may further include an opening 220 (as shown in FIGS. 7-9). Opening 220 may include a rubberized foam insert having an elongate slit to receive telecommunication cables while preventing the infiltration of debris (e.g., leaves, soil, pollen) into the cavity 206. In other embodiments, the opening or aperture 220 of the housing 200 may employ a simple gasket (not shown) through which a fiber cable (FIGS. 8 and 9: 344) may be fed or a bulkhead connection (also not shown) may be employed. A bulkhead connection may employ a pre-terminated fiber module installed between an internal wall/bulkhead and the internal fiber-optic component (converter 302). Upper housing 204 may be further provided with oval-shaped, diagonal openings for ventilation 204a. The secure enclosure or enclosable box 100 may be configured to provide a compartment clearance so as to provide universal flexibility when choosing components, irrespective of the service provider. This modular system may be pre-installed and/or pre-fabricated (to be provided to a technician for field installation).

As shown in FIG. 7, the housing 200 may include a segregating component panel 400 that is configured to define a compartment within the box cavity that separates the coaxial splitter 322 from the fiber optics converter 302 (although other components may be substituted as necessary). The segregation panel 400 may be configured to allow one of the component 302, 322 to be mounted to either side of the panel 400 (shown in FIGS. 7-9 configured to mount component 322 to the upper surface of panel 400).

One or more panel mounting hinges 400A may be provided to pivotally attach the segregation component panel 400 and a component compartment base member 440. The panel 400 may be provided with a pivoting mechanism. For example, panel mounting hinges 400a. The edge of the box where panel mounting hinges 400a are located may be an edge that is different than the edge 208a (FIG. 9) where box mounting hinges 200a are located, but the panel mounting hinges may be provided on any edge of the housing portion 202. The panel hinge 400a may be configured to allow the panel 400 to open by pivoting relative to a base member 400 (thereby allowing access to components mounted beneath the segregating component panel 400 or to the underside thereof). As such, the hinged panel configuration of the secure enclosure 100 provides the service technician with additional options/choices when choosing telecommunication equipment/components and the manufacturers of such equipment/components. Furthermore, the secure enclosure 100 provides a standardized approach to combining the telecommunications equipment/components 302, 322 while maintaining a safe and effective approach to handling, maintaining and modifying the components 302, 322.

FIG. 7 shows the hidden component compartment upper panel or door 400 may be configured to attach to a hidden compartment base or floor 440 that are each configured to have side edge surfaces that conform to the shape of an inner surface of the lower housing 202. The component compartment base member 440 may have an external lower back (non-mounting) surface that is configured to rest substantially flush with the inner surface of housing 202. Further, the base member 440 may have two sets of vertically protruding portions (four shown in FIG. 7). The vertical protruding portions may (as discussed below) be configured to provide a boundary ensuring a minimum permissible bend radius of fiber-optic cables and/or include pivotally movable mounting portions (e.g., hinges) at the protruding end of the vertically protruding portions. Moreover, as shown in FIG. 7, the base member 440 may be configured to conform to mimic the shape of lower surface 202. The hidden compartment upper panel or door 400 may include mini protruding portions 400b that are configured to allow for installation of a specific type of telecommunication component (a coaxial configuration is shown, but other telecommunication configurations may be desirable).

Moreover, hidden compartment upper panel or door 400 may be provided with an extending side portion 402, which may extend back toward base member/compartment floor 440 such that the extending portion 402 of the upper panel 400 touches or nearly touches the compartment floor 440. In this configuration, the panel 400 may further include a cord extension portion 402A, which may extend the panel 400 towards the opening 220. In this respect, the panel 400, with extending portions 402 and 402A may completely (or nearly completely) enclose all components directed towards the first telecommunication system 300 (e.g., fiber converter 302, other fiber components). Thus, the upper panel 400 and lower compartment floor (base member) 440 provide partitioning or segregation of the first telecommunication system 300. Thus, a telecommunication service provider, may be able to install components outside of or on top of (mounted on top of) panel 400 without worrying about component 302 being disturbed (i.e., a coaxial cable only installer may install coaxial cable in a fiber box without being allowed access to the fiber portion of the box). In FIG. 7, the hidden compartment base or floor 440 may be configured to be mounted by the component 302, such as, including two sets of three protruding cam portions (as shown in FIG. 7).

To facilitate retrofitting/modification of existing entry boxes, it may be desirable to produce a pre-fabricated retrofit kit or assembly comprising: the base panel 440 (see FIG. 7) inserted within and affixed to the first housing portion 202 and a segregation panel 400 hinge-mounted to the base panel/member 440. The axis of the compartment hinge 400A of the segregation component panel 400 may be orthogonal to the hinge-axis of the box mounting hinge 200A. In this embodiment, the fiber optic converter 302 may be affixed to the base panel 440 while the coaxial cable splitter 322 is mounted to the segregating panel 400. It will also be appreciated that the fiber-optic converter 302 may be affixed to the underside of the segregating panel 400.

The features of the first embodiment in FIG. 7 are shown in more detail in FIGS. 8 and 9. In particular, FIGS. 8 and 9 show how the panel 400 of the house box 100 may provide an upper (easily accessible) compartment 206A and an internal (hidden) enclosable component compartment 206B. FIG. 8 shows the upper component compartment 206A being accessible when the panel 400 is in an open configuration (the panel 400 has an unhinged, un-mounted end opposite the mounted hinge 400a that is raised vertically above the mounted hinge 400A).

As shown in FIGS. 7-9, the panel 400 may be configured such that components of a first telecommunication system 300 (e.g., fiber optic converter 302) may be disposed within the internal enclosable compartment 406 and, thus, segregated from a second separate type of telecommunication system 320 (e.g., coaxial cable components, such as, splitter 322, amplifiers, transformers, power converters, etc.) resting above the nested compartment 206B and separating component panel 400. The segregation of respective components from different telecommunication systems prevents, for example, a service technician from inadvertently interfering with, damaging, or degrading the performance of the components within the internal enclosed compartment. In some embodiments, the telecommunication system component (the converter 302) may be provided along aside of the panel 400.

In FIG. 8, the panel 400 is shown as mounted on compartment base member 440 via hidden mounting hinges 400A. The separator panel 400 of FIGS. 7-9, segregates the first and second telecommunications systems 300, 320 by providing a component compartment (internal nested cavity) 206B within the larger enclosure/box cavity 206. In some embodiments, the compartment 206B may be a size that is large enough to house a converter 302 and a channel 420 (described below). More specifically, the panel 400 may provide a component compartment 206B that segregates components related to the first telecommunication systems 300 (e.g., converter 302 and fiber optic input cable 344 which is disposed through the input aperture 220, and may be forced to travel around converter 302 via channel 420) from the remaining components (which may be directed towards another different telecommunications system), such as, splitter 322.

The panel 400 (as shown) may be configured to enclose a peripheral channel 420 formed between an outer periphery 360 of the fiber-optic component 302 and the lower housing portion 202. More specifically, the channel 420 may be a substantially rectangular shaped channel that ensures a maximum bend radius R (at each of the four corners of the rectangular channel 420) which is greater than the minimum bend radius r of a fiber optic cable (e.g., fiber optic cable 344).

To ensure the bend radius is proper, the channel 420 may provide a channel that encircles the component 302. The channel may be configured to ensure the fiber optic cable 344 is properly shaped by utilizing three sides of the lower housing 202 in conjunction with the extending panel portion 402. In other words, the channel 420 may have a width dimension (i.e., the dimension between fiber-optic system component 302 and the lower housing portion 202, and/or the vertical wall 402 of the panel 400) which produces a maximum bend radius R (at each of the four corners of the rectangular channel 420) which is greater than the minimum permissible bend radius r of the fiber optic cable 344. That is, the geometry of the channel 420 allows the fiber optic cable to follow an arcuate path or bend R which exceeds the minimum bend radius r of the fiber optic cable 344. The bend radius R of the channel 420 must be greater than the minimum permissible bend radius r of the fiber optic cable 344 to prevent signal losses as the optical signal negotiates the arcuate path, curve or bend at each corner of the channel 420. As the bend radius R of an optic fiber or filament decreases, the incident light energy is not fully reflected internally of the optic filament. That is, the light energy is refracted out of the filament causing a portion of the light energy to be absorbed, or a portion of the signal to be lost. As the level of refraction increases, signal quality decreases.

FIG. 9 shows a perspective view of the first embodiment of the secure enclosure or enclosable box of FIG. 8 with the segregating or hidden compartment panel 400 now in a closed state or position. The closed state/position is a state in which a component 322 for the second telecommunication system 322 may be installed while access is prevented/restricted to the component of the first telecommunication system 300 (hidden in FIG. 9). The optic signal carried by the cable 344 may be converted to a digital signal by the fiber-optic converter 302.

As shown in FIG. 9, fiber optic converter 302 may be configured to convert an optic signal into a digital signal for transmission. The digital signal may be conveyed to the cable splitter 322 from the converter 302 via a short coaxial input cable 304. The cable splitter 322 may split the received signal into multiple transmission signals, which may be subsequently output via coaxial output ports 364 attached to, for example, coaxial cables coaxial cables 306, 308, 310, 312 that exit the housing 200 through output apertures 224 (such that they may be fed to the connections at the nearby house or residence). The component 322 may comprise a coaxial input port 354, which may be configured to receive a signal from connected cable 304 from the fiber optic output port 366. Further, the fiber optic input port 356 of the fiber optics component 302 may be configured to receive a fiber optic input signal from fiber optic cable 344, which may be wrapped around the outer periphery 360 of the component 302. The second telecommunication system 320 may be a coaxial cable system 320 that includes a cable splitter 322 configured to split a signal received via the input cable 304 into multiple signals exiting via corresponding output cables 306, 308, 310, 312. Accordingly, the secure enclosure or box 100 may provide both fiber optic and coaxial cable systems 300, 320 each having at least one different type of telecommunication system component 302, 322.

Figure 13:
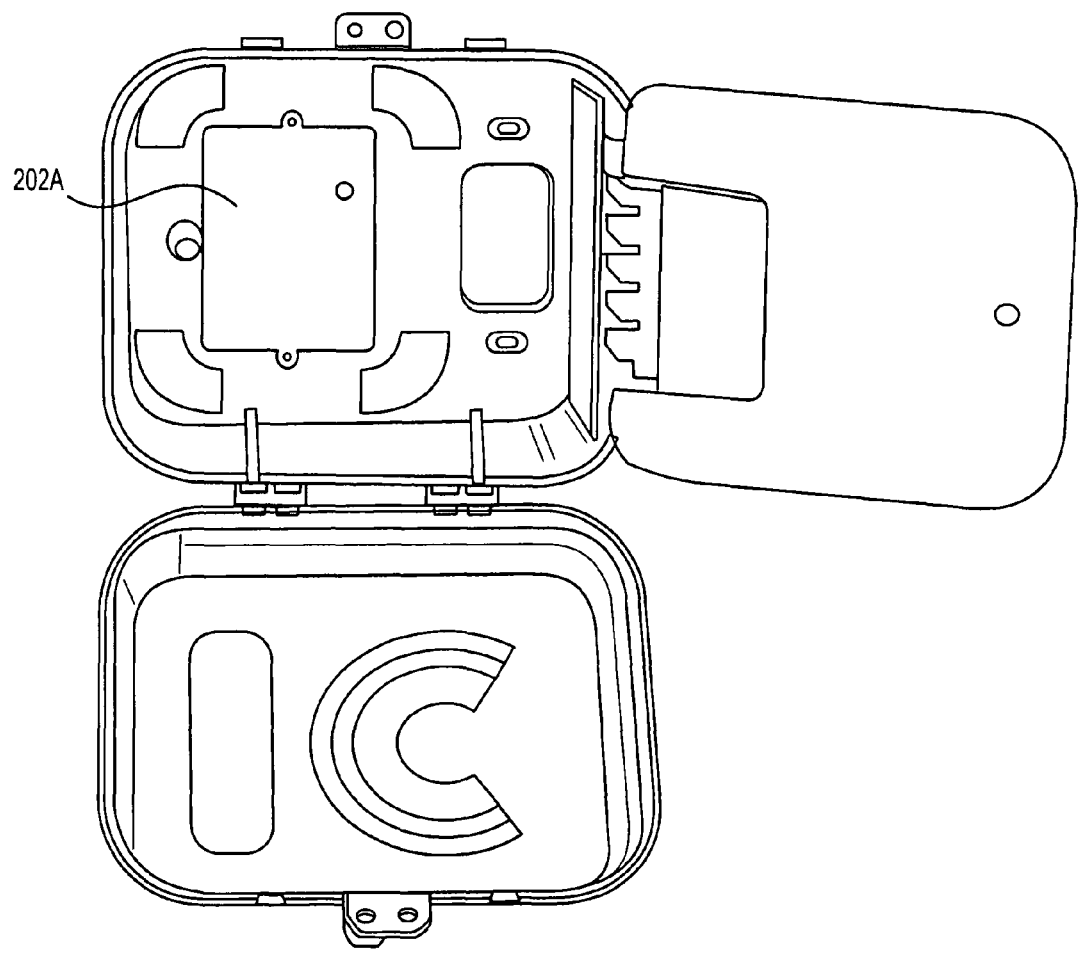
FIG. 13 shows a perspective view of the second embodiment of the secure enclosure or enclosable box with a segregating or hidden compartment panel in an open state (with components not yet installed).
Figure 14:
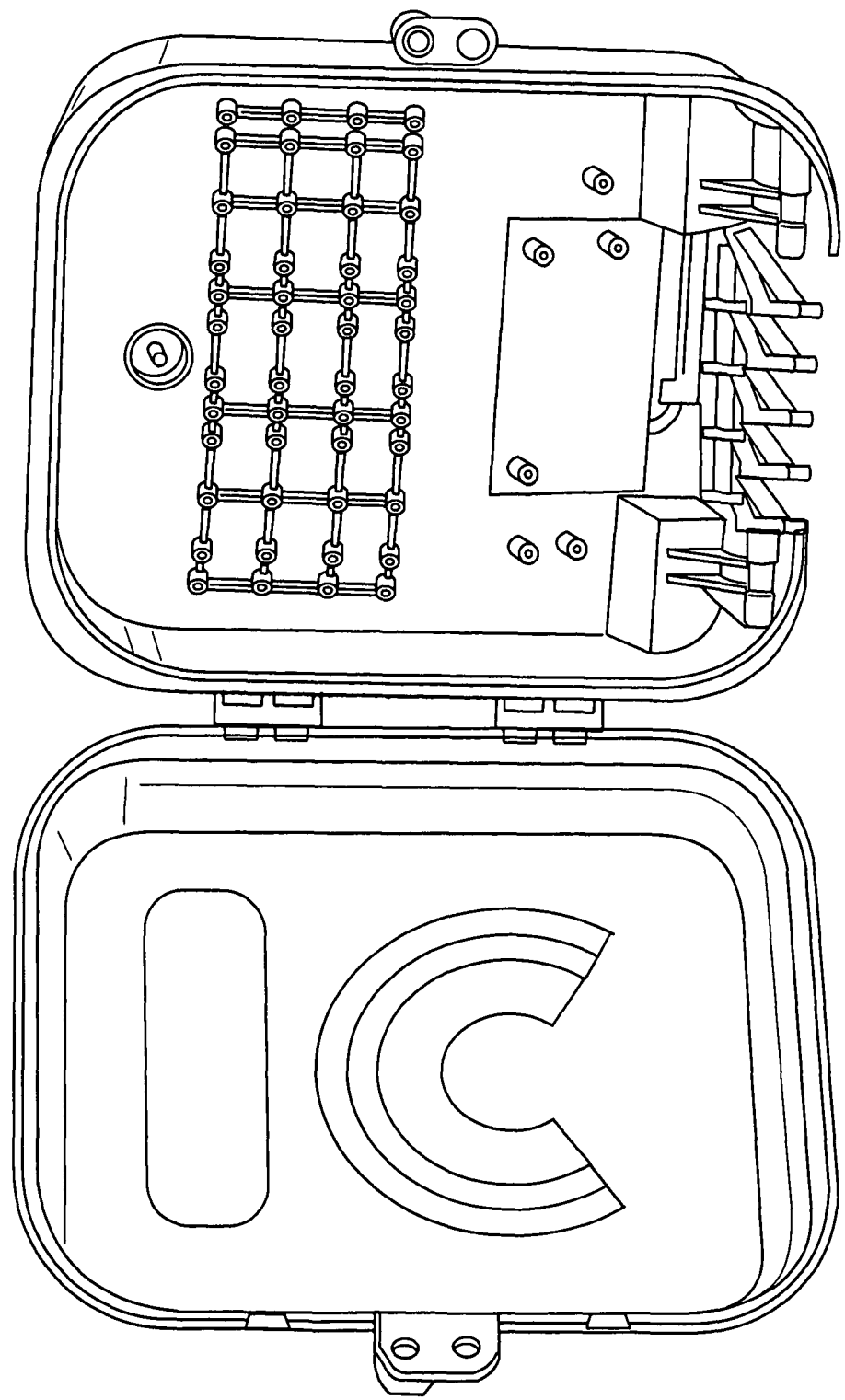
FIG. 14 shows a perspective view of the second embodiment of the secure enclosure or enclosable box with the segregating or hidden compartment panel in a closed state (with components not yet installed).

As shown in FIG. 9, the housing portions 202, 204 may provide enclosure (box) mounting hinges along one edge 208A and include aligned locking tabs 210 along the opposite edge 208Bb (to facilitate opening/closing of the secure enclosure 100). The locking tabs 210 may be a molded U-shaped opening 212 on the opposite edge in one of the housing portions 202, 204 and a resilient clasp 214 integrally formed in the same opposite edge of the other of the housing portions 202, 204. The locking tabs 210 may be augmented by a lock hole fitting portion 216 having aligned apertures 218 configured to allow the opposite end of the housing portions 202, 204 to be closed/fastened together, such as, by a padlock. In some embodiments, the panel 400 may be configured in a similar manner, such that, the panel may have an opening/clasp mechanism to open the compartment. In other embodiments, (as shown in FIGS. 13 and 14) the internal compartment 206B may be accessible via a back panel 202A (In this embodiment, the panel may be permanently affixed so as to not provide easy access, via, for example, a tab/opening mechanism).

Figure 10:
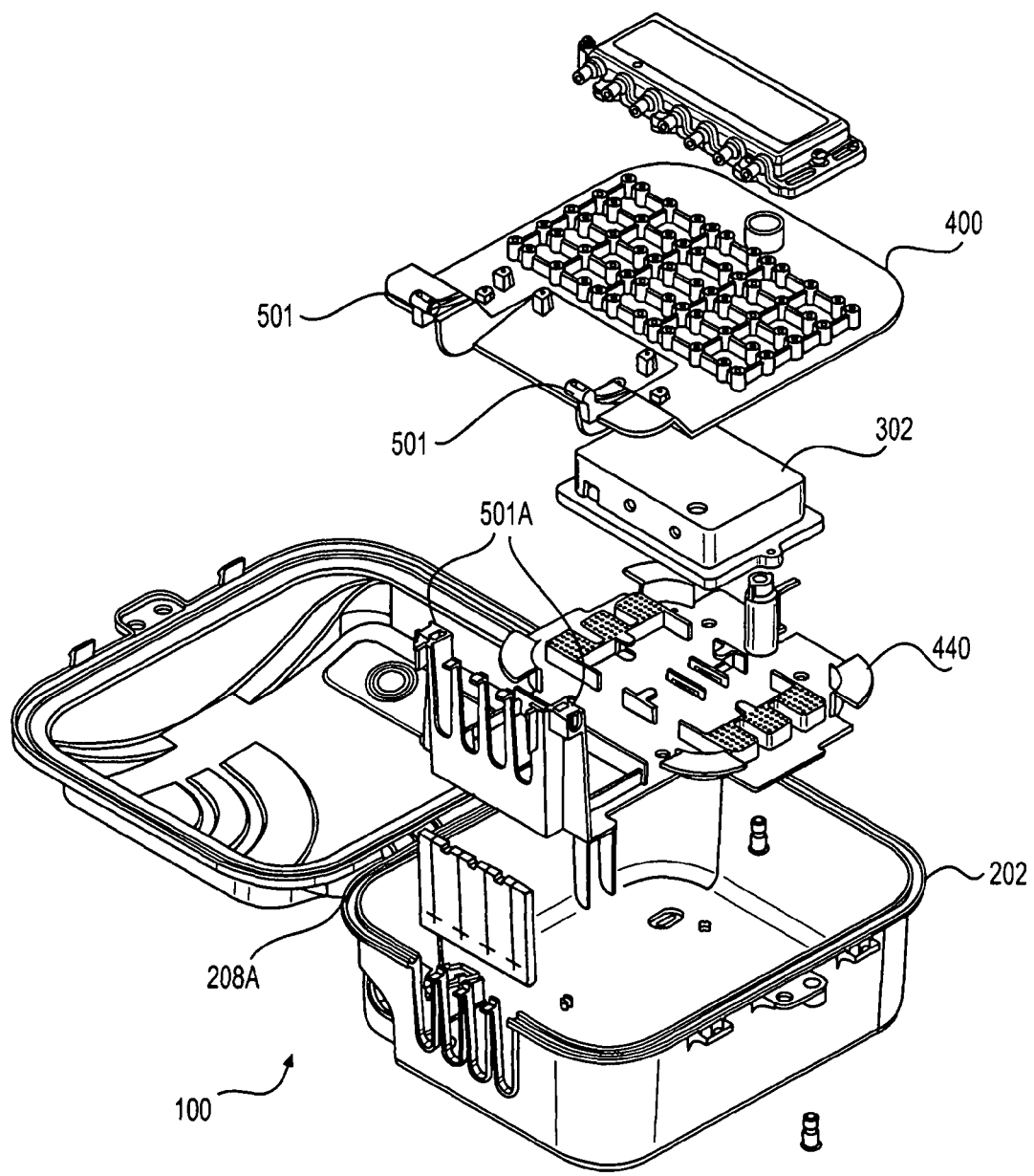
FIG. 10 shows an exploded view of a second embodiment of the secure enclosure or enclosable box.

FIG. 10 shows an exploded view of a second embodiment of the secure enclosure or enclosable box 100. In particular, FIG. 10 shows a compartment panel 400 that includes two protruding cam portions 501 that may be attached to cam receiving portions 501A of the compartment base member 440 such that the panel 400 may be pivotally repositioned to open and close the compartment cavity underneath the panel. The panel 440, in FIG. 10, may a vertically extending wall that provides the panel at a height such that the panel, when closed (closed meaning that the panel is substantially parallel to a bottom floor of housing 202), provides a cavity/compartment large enough to enclose a component (e.g., fiber optics component 302).

Figure 11:
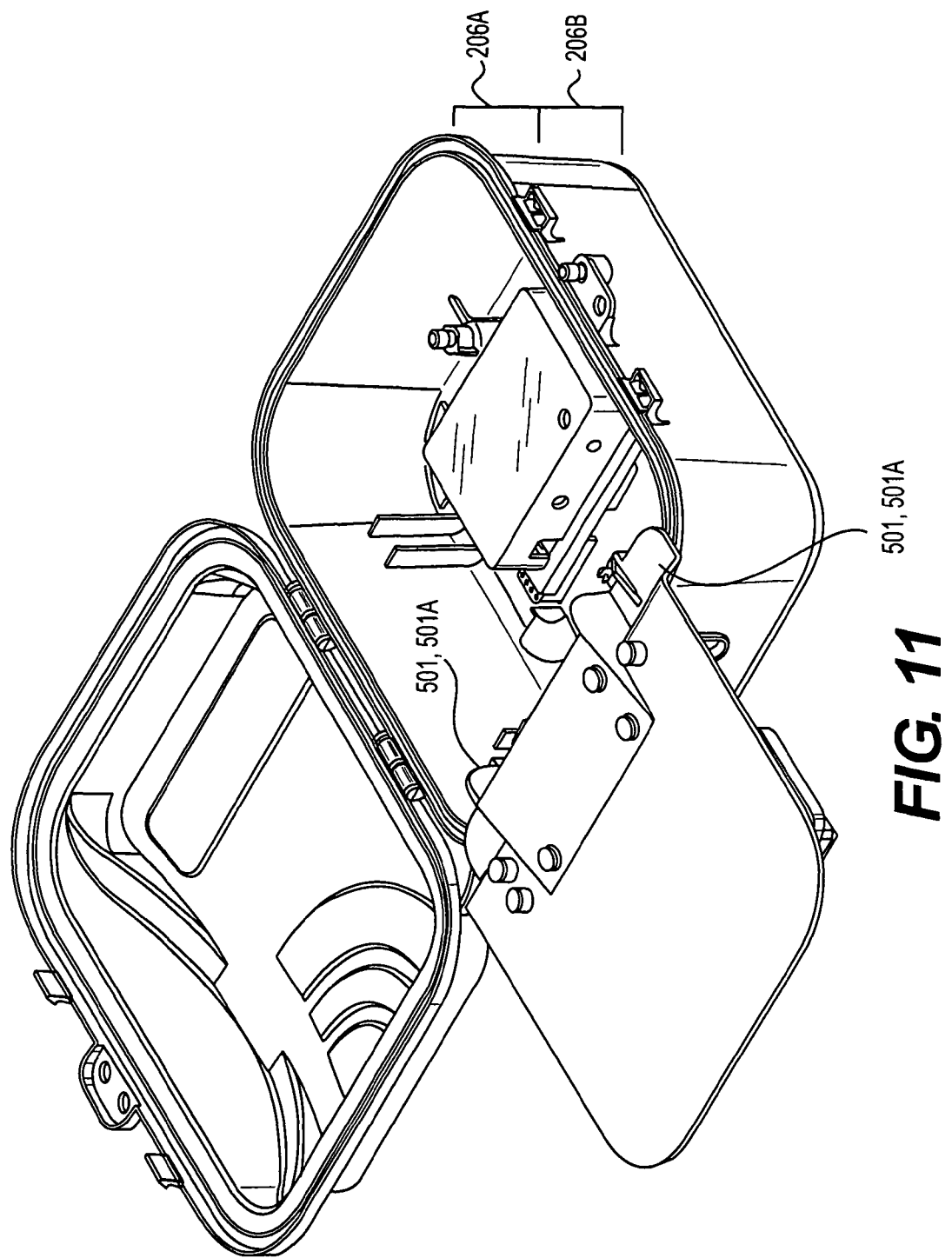
FIG. 11 shows a perspective view of the second embodiment of the secure enclosure or enclosable box with a segregating or hidden compartment panel in an open state.

In the same respect, FIG. 11 shows how (in the second embodiment) the cam protruding portions 501 may be inserted into the cam receiving portions 501A to provide a mechanism allowing the panel 400 to pivotally open and close. In FIG. 11, the panel 400 is pivotally opened such that the cavity 206B, which is large enough and configured to hold a component 302, is accessible. As shown in FIG. 11, the panel 400 may provide the cam protruding portions 501 on extending column portions on a raised edge of the panel 400. In particular, the panel 400 may include raised partial ledges configured with the cam portions 501. The ledges may also be provided such that they are on opposite sides of an opening that allows for cables/cords to enter the first or second compartments 206A, 206B.

Figure 12:
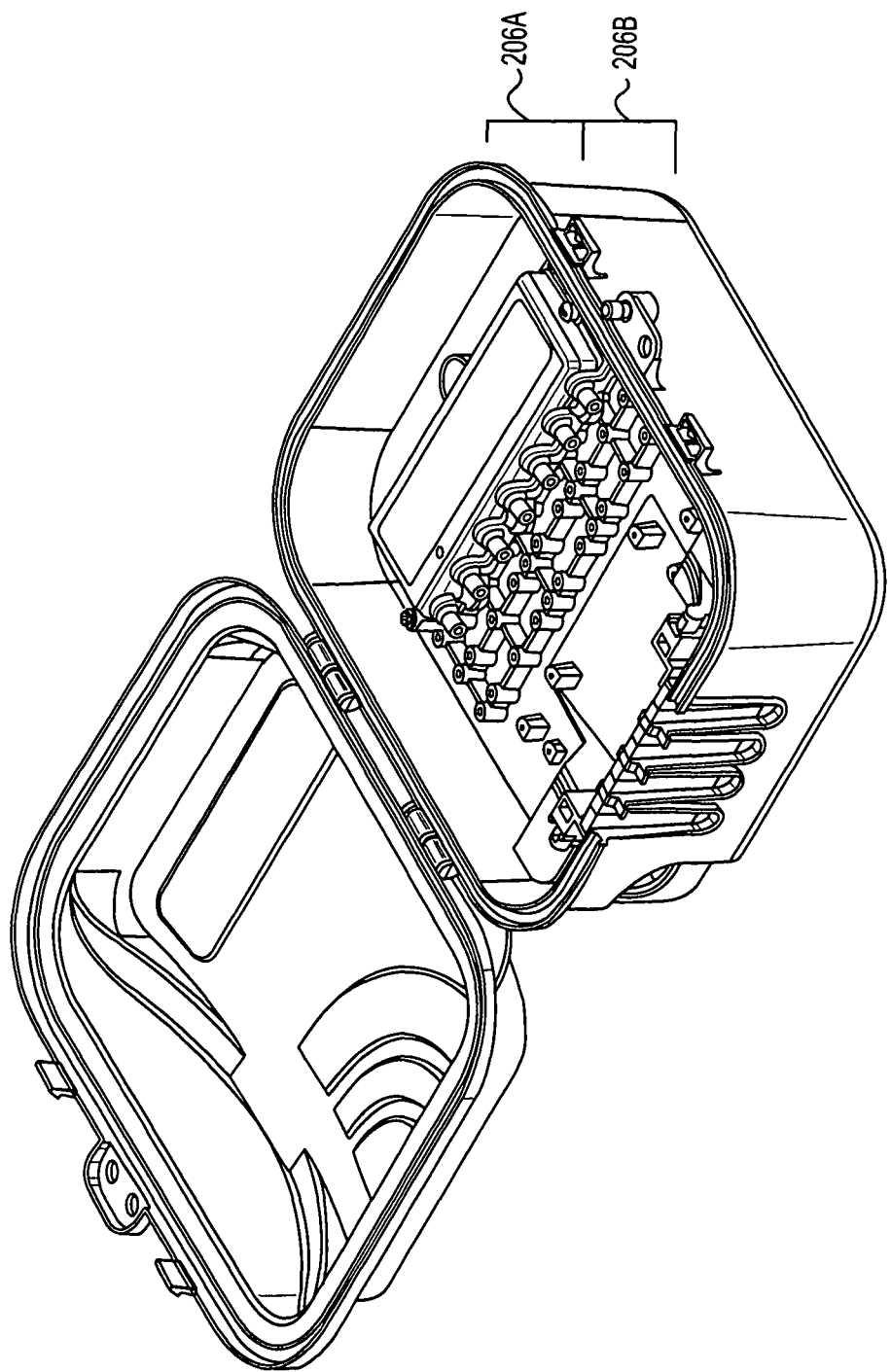
FIG. 12 shows a perspective view of the second embodiment of the secure enclosure or enclosable box with the segregating or hidden compartment panel in a closed state.

FIG. 12 shows the second embodiment where the panel 400 is in a closed state or position. In particular, FIG. 12 shows a configuration where the panel 400 splits the cavity 206 into two component compartments 206A and 206B. In FIG. 12, compartment 206B is hidden (but contains the converter 302), while the upper compartment 206A, which holds the component 322 is accessible. In this configuration, when closed (and/or locked), the second telecommunication system (coaxial system) is accessible, while the first telecommunication system (the fiber system) is hidden and/or protected from disturbance.

FIG. 13 illustrates the upper and lower housing portions with panel 400 attached in the second embodiment pre-component installation. The housing portion 202 may be further configured to be mounted and/or attached to a utility/telephone pole and/or to a residential or commercial building. Further, FIG. 13 shows a back panel 202A that may provide a rear entry access door or panel that may be configured to open and close to enter the lower compartment 206B, while not disturbing the other remaining portion of the cavity.

FIG. 14 shows the second embodiment (with the components removed) that may be pre-fabricated to be sold as a unit. In particular, as shown in FIG. 14, the panel 400 is configured with a grid like pattern to allow for mounting/attachment of a component (e.g., component 322) to the panel 400. This grid like pattern may be a universal grid mounting pattern that allows for various makes and models of components (such as different types of splitters 322) to be mounted to the panel 400.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A compartmentalized box for housing components for telecommunications systems, comprising:
   a first housing portion;
   a second housing portion configured to be pivotally coupled to the first housing portion, the first housing portion and the second housing portion cooperating to define an enclosure having a cavity, the second housing portion configured to be pivotally movable relative to the first housing portion between an open configuration providing access to the cavity and a closed configuration preventing access to the cavity; and
   a compartment panel disposed in the cavity and configured to be pivotally coupled to the first housing portion, the compartment panel being pivotally movable relative to the first housing portion between a closed position and an open position,
   wherein the compartmentalized box is configured to provide at least two access states when in the open configuration,
   wherein, in a first access state of the at least two access states, (i) the first housing portion and the second housing portion are in the open configuration and the compartment panel is in a closed position such that the compartment panel divides the cavity into a first compartment configured to house a first type of telecommunications system component therein and a second compartment configured to house a second type of telecommunications system component therein, (ii) the first compartment is open such that the first type of telecommunications system component is accessible to a user, and (iii) the second compartment is closed to block access to the second type of telecommunications system component,
   wherein, in a second access state of the at least two access states, (i) the first housing portion and the second housing portion are in the open configuration and the compartment panel is in an open position, and (ii) the second compartment and the second type of telecommunications system component are accessible to the user, and
   wherein the second access state only occurs after the first access state occurs.

2. The compartmentalized box of claim 1, wherein the second type of telecommunications system component is a fiber optic system component.

3. The compartmentalized box of claim 2, wherein the first type of telecommunications system component is a coaxial cable component.

4. The compartmentalized box of claim 1, wherein the first housing portion and the second housing portion are both constructed of weatherproof, durable material, the material being one of plastic and metal.

5. The compartmentalized box of claim 1, wherein the first housing portion or the second housing portion is configured to be attached or mounted to a utility pole and/or a residential or commercial building.

6. A compartmentalized box for housing components for telecommunications systems, comprising:
   a first housing portion;
   a second housing portion configured to be pivotally coupled to the first housing portion, the first housing portion and the second housing portion cooperating to define an enclosure having a cavity, the second housing portion being configured to be pivotally movable relative to the first housing portion between an open configuration providing access to the cavity and a closed configuration preventing access to the cavity; and a compartment panel disposed in the cavity and configured to be pivotally coupled to the first housing portion, the compartment panel configured to be pivotally movable relative to the first housing portion between a closed position and an open position;

wherein a first type of telecommunications system component is mounted to the compartment panel, wherein a second type of telecommunications system component is mounted to the first housing portion, wherein the compartmentalized box is configured to provide at least two access states when in the open configuration, wherein, in a first access state of the at least two access states, (i) the first housing portion and the second housing portion are in the open configuration and the compartment panel is in the closed position such that the compartment panel divides the cavity into a first compartment and a second compartment, (ii) the first compartment is open such that the first type of telecommunications system component is accessible to a user, and (iii) the second compartment is closed to block access to the second type of telecommunications system component, wherein, in a second access state of the at least two access states, (i) the first housing portion and the second housing portion are in the open configuration and the compartment panel is in the open position, and (ii) the second compartment and the second type of telecommunications system component are accessible to the user, and wherein the second access state only occurs after the first access state occurs.

7. The compartmentalized box of claim 6, wherein the second type of telecommunications system component is a fiber optic system component.

8. The compartmentalized box of claim 7, wherein the first type of telecommunications system component is a coaxial cable component.

9. The compartmentalized box of claim 6, wherein the first housing portion and the second housing portion are both constructed of weatherproof, durable material, the material being one of plastic and metal.

10. The compartmentalized box of claim 6, wherein the first housing portion or the second housing portion is configured to be attached or mounted to a utility pole and/or a residential or commercial building.

11. An enclosable box for housing components from more than one type of telecommunications system, comprising:
a first housing portion;
a second housing portion;
a box mounting hinge that connects the first housing portion and the second housing portion so that the first housing portion is pivotally coupled to the second housing portion, the first housing portion and the second housing portion cooperating to define an enclosure having a cavity;
an internal telecommunications component compartment panel; and
a compartment panel mounting hinge that connects the internal telecommunications component compartment panel with one of the first and second housing portions, wherein the box mounting hinge is configured to allow the first housing portion and second housing portion to open and close in a clam like manner, wherein the compartment panel mounting hinge is configured to allow the internal telecommunications component compartment panel to open and close an internal compartment that is large enough to enclose at least a first type of telecommunications system component, wherein the enclosable box is configured to provide at least two access states when open, wherein, in a first access state of the at least two access states, (i) the first housing portion and the second housing portion are in the open configuration and the internal telecommunications component compartment panel is closed, (ii) a second type of telecommunications system component is accessible to a user, and (iii) the internal compartment is closed to block access to the first type telecommunications system component, wherein, in a second access state of the at least two access states, (i) the first housing portion and the second housing portion are in the open configuration and the internal telecommunications component compartment panel is open, and (ii) the internal compartment and the first type of telecommunications system component are accessible to the user, and wherein the second access state only occurs after the first access state occur.

12. The enclosable box of claim 11, wherein an upper surface of the internal telecommunications component compartment panel is configured to be mounted by the second type of telecommunications component within the housing.

13. The enclosable box of claim 11, wherein the first type of telecommunications system component is a fiber optics telecommunications system component, and the second type of telecommunications system is a coaxial cable component.

14. The enclosable box of claim 11, further comprising:
another compartment panel mounting hinge provided on a same side of the connected first and second housing portions as the compartment panel mounting hinge, wherein
an entry hole is formed in the connected first and second housing portions in between the compartment panel mounting hinges and provides clearance for external cables/cords to enter into the enclosable box and be provided to the internal compartment and/or a portion of the cavity of the enclosable box outside of the internal compartment.

15. The enclosable box of claim 11, wherein
the internal telecommunications component compartment panel, when closed, is configured to provide a secure enclosure for housing the first type of telecommunications system component within the internal compartment, and
the enclosable box is configured to, when the enclosable box and the internal telecommunications component compartment panel are both closed, provide a secure enclosure for housing the second type of telecommunications system component in a portion of the cavity of the enclosable box outside of the internal compartment.

16. The enclosable box of claim 11, wherein the box hinge side of the connected first and second housing portions includes one or more apertures that are configured to feed wires from the second type of telecommunications system component to an exterior of the enclosable box, thereby facilitating the persistent connection of the second type of telecommunications system component inside the enclosable box regardless of whether the internal telecommunications component compartment panel is in an open or closed position.

17. An access control device for permitting access to a coaxial cable component while selectively blocking access to a fiber optical component comprising:
  an access control panel member configured to be coupled to a coaxial cable component while blocking access to a fiber optical component, the coaxial cable component configured to be coupled to a coaxial cable; and
  an optical fiber configuration base member configured to be coupled to an optical fiber component and to arrange the optical fiber component so as to create a peripheral optical fiber cable path around a portion of the optical fiber component,
  wherein the access control panel member is configured to pivot between a first access position, where an operator is permitted to access the coaxial cable component when the coaxial cable component is coupled to the access control panel member and where an operator is not permitted to access the optical fiber component, and a second access position, where an operator is permitted to access the optical fiber component without having to de-couple the coaxial cable component from the coaxial cable, and
  the peripheral optical fiber cable path is configured to receive an optical fiber cable, encircle the optical fiber cable around a portion of the optical fiber component, and shape the optical fiber cable so as to be connected to the optical fiber component while preventing the optical fiber cable from exceeding a maximum optical fiber cable bend radius of the optical fiber cable when the optical fiber cable is connected to the optical fiber component.

18. The access control device of claim 17, further comprising:
  a first housing portion; and
  a second housing portion configured to be pivotally coupled to the first housing portion, the first housing portion and the second housing portion cooperating to define an enclosure having a cavity, the second housing portion configured to be pivotally movable relative to the first housing portion between an open configuration providing access to the cavity and a closed configuration preventing access to the cavity,
  wherein the cavity is configured to house the access control panel member and the optical fiber configuration base member.

19. The access control device of claim 17, wherein the second access position only occurs after the first access position occurs.

20. The access control device of claim 18, wherein the second access position only occurs after the first access position occurs.

21. The access control device of claim 17, wherein the access control panel member is further configured to be pivotally coupled to the optical fiber configuration base member.

22. A compartmentalized box for housing components for telecommunications systems, comprising:
  a first housing portion;
  a second housing portion coupled to the first housing portion and being configured to be movable relative to the first housing portion between an open configuration providing access to the cavity and a closed configuration preventing access to the cavity; and
  a compartment panel disposed in the cavity and configured to be coupled to one of the first housing portion and the second housing portion, and being movable relative to the one of the first housing portion and the second housing portion between a closed position and an open position,
  wherein the compartmentalized box is configured to provide at least two access states when in the open configuration,
  wherein, in a first access state of the at least two access states, (i) the first housing portion and the second housing portion are in the open configuration and the compartment panel is in a closed position such that the compartment panel divides the cavity into a first compartment configured to house a first type of telecommunications system component therein and a second compartment configured to house a second type of telecommunications system component therein, (ii) the first compartment is open such that the first type of telecommunications system component is accessible to a user, and (iii) the second compartment is closed to block access to the second type of telecommunications system component,
  wherein, in a second access state of the at least two access states, (i) the first housing portion and the second housing portion are in the open configuration and the compartment panel is in an open position, and (ii) the second compartment and the second type of telecommunications system component are accessible to the user, and
  wherein the second access state only occurs after the first access state occurs.

23. The compartmentalized box of claim 22, wherein a first type of telecommunications system component is mounted to the compartment panel, and a second type of telecommunications system component is mounted to the first housing portion.

24. The compartmentalized box of claim 22, wherein the compartment panel is pivotally coupled to one of the first and second housing portions.

* * * * *